United States Patent [19]

Kuster et al.

[11] Patent Number: 5,009,695
[45] Date of Patent: Apr. 23, 1991

[54] APPARATUS FOR PRODUCING TWO DIMENSIONALLY BENT GLASS

[75] Inventors: Hans-Werner Kuster, Aachen, Fed. Rep. of Germany; Luc Vanaschen, Eupen, Belgium

[73] Assignee: Saint-Gobain Vitrage, Courbevoie, France

[21] Appl. No.: 362,346

[22] Filed: Jun. 6, 1989

[30] Foreign Application Priority Data

Jun. 8, 1988 [DE] Fed. Rep. of Germany ....... 3819503

[51] Int. Cl.$^5$ ............................................. C03B 23/03
[52] U.S. Cl. .................................. 65/182.2; 65/273; 65/289; 65/290; 65/291
[58] Field of Search ...................... 65/182.2, 273, 275, 65/287, 289, 290, 291

[56] References Cited

U.S. PATENT DOCUMENTS

| | | | |
|---|---|---|---|
| 3,399,985 | 9/1968 | Greener et al. | 65/374.15 |
| 3,459,521 | 8/1969 | Nedelec | 65/356 X |
| 3,469,963 | 9/1969 | Beattie | 65/356 X |
| 3,473,910 | 10/1969 | Wilde et al. | 65/182.2 |
| 3,634,059 | 1/1972 | Miller | 65/374.11 X |
| 3,869,271 | 3/1975 | Shaffer et al. | 65/182.2 |
| 4,432,782 | 2/1984 | Seymour | 65/182.2 |
| 4,612,031 | 9/1986 | Bennett et al. | 65/273 |
| 4,661,141 | 4/1987 | Nitschke et al. | 65/273 |
| 4,678,495 | 7/1987 | Yoshizawa | 65/374.13 |
| 4,682,997 | 7/1987 | Halberschmidt et al. | 65/104 X |
| 4,764,196 | 8/1988 | Boutier et al. | 65/104 X |
| 4,775,402 | 10/1988 | LeTemps et al. | 65/104 X |
| 4,802,904 | 2/1989 | Boutier et al. | 65/273 |
| 4,838,920 | 6/1989 | Blasquez-Gonzales | 65/273 |
| 4,840,657 | 6/1989 | Orain | 65/273 |

FOREIGN PATENT DOCUMENTS

| | | | |
|---|---|---|---|
| 766145 | 10/1971 | Belgium | 65/106 |
| 1083638 | 4/1986 | Japan | 65/374.15 |

Primary Examiner—Joye L. Woodard
Attorney, Agent, or Firm—Oblon, Spivak, McClelland, Maier & Neustadt

[57] ABSTRACT

An apparatus for producing two-dimensionally bent and optionally tempered glass plates includes a roller oven (1), a pressing and bending station (2) and a cooling station (3). A lower male mold-like, full surface bending mold (10) with two-dimensionally shaped bending surface is arranged in the pressing and bending station (2). The top surface of the bending surface of the bending mold (10) is located in the conveying plane defined by the conveying rollers (5). The wall of the bending mold (10) forming the bending surface is provided with bores (14), which can be supplied with hot gas for forming a hot gas cushion. After positioning the glass plate (4) on the hot gas cushion, the female mold-like frame bending mold (11) is lowered onto the glass plate (4). The bent glass plate slides on the hot gas cushion into the cooling station (3).

14 Claims, 6 Drawing Sheets

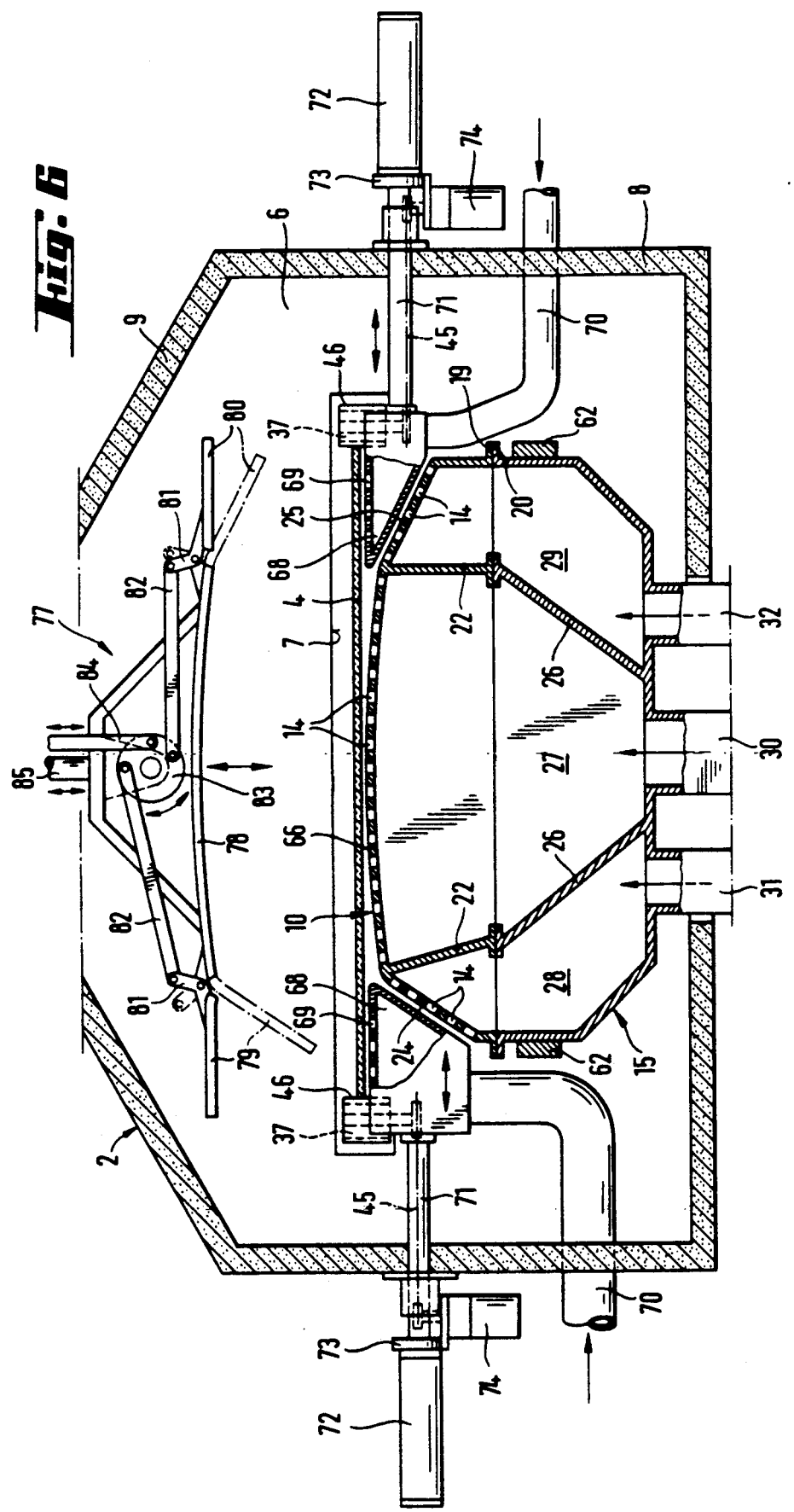

APPARATUS FOR PRODUCING TWO DIMENSIONALLY BENT GLASS

BACKGROUND OF THE INVENTION

1. Field of the Invention

The present invention relates to an apparatus for producing two-dimensionally bent and optionally tempered glass plates, with a roller oven for heating planar glass plates in a horizontal position to the bending temperature, a pressing and bending unit following the roller oven and a cooling device following the pressing and bending unit.

2. Background of the Related Art

In a known apparatus for producing cylindrically bent glass plates, the conveying rollers have in the end portion of the roller oven a curvature which increases from roller to roller. The glass plate to be bent is conveyed into the bending station on the conveying rollers. The pressing and bending unit comprises a full or solid surface bending mold positioned above the conveying rollers and a frame bending mold lowerable below the supporting regions of the conveying rollers with which the glass plate is pressed against the upper full surface bending mold. The pressing process is followed by the bent glass plate again being placed on the conveying rollers with the aid of which it is brought into the following cooling station (German Patent 34 38 705).

In order to reduce the deterioration to the optical quality of the heated glass plates resting on the conveying rollers within the bending station under the effect of the weight of the plates, in the known apparatus part of the glass plate weight is compensated by a hot gas flow directed from below against the glass plate between the conveying rollers. Despite these measures it is not possible to completely eliminate the influence of the non-uniform supporting of the glass plate by the conveying rollers. In addition, the known apparatus is relatively complicated and costly.

SUMMARY OF THE INVENTION

The object of the present invention is to provide an apparatus of the aforementioned type permitting the production of two-dimensionally bent glass plates with an even further improved optical quality.

The apparatus according to the invention includes a pressing and bending unit comprising a lower male mold-like full surface bending mold with a two-dimensionally shaped bending surface, whose top surface is located in the conveying plane defined by the conveying rollers in the roller oven. The wall of the full surface bending mold forming the bending surface is provided with bores, which can be subject to the action of hot gas under overpressure for forming a hot gas cushion and that following the positioning of the glass plate on the hot gas cushion the female mold-like opposite mold is lowered onto the glass plate.

In the case of the apparatus according to the invention, the lower bending mold is constructed as a full or solid surface bending mold, so that within the bending station no undesired deformations of the glass plate can occur as a result of the weight of said plate. Simultaneously, said full surface bending mold forms a hot gas cushion, on which the glass plate from the roller oven is brought in a floating manner into its position necessary for the bending process. During the passage of the heated glass plates into the bending station on the hot gas cushion a more or less marked prebending occurs due to the action of the weight of the glass plates. After positioning has taken place, i.e., immediately prior to the performance of the pressing process, the hot gas supply to the bending mold can be briefly interrupted, so that the glass plate is directly pressed by the upper mold onto the bending surface of the lower full or solid mold.

The inventive apparatus is eminently suitable for the production of bent and tempered glass plates with a substantially planar central field and lateral region bent to a greater or lesser extent. Glass plates of this type are, e.g., used for the glazing of display cases.

BRIEF DESCRIPTION OF THE DRAWINGS

Appropriate developments and variants of the inventive apparatus form the subject matter of subclaims and can be gathered from the following description of embodiments with reference to the drawings, wherein:

FIG. 6 is a vertical cross-section along lines VI—VI in FIG. 5.

DETAILED DESCRIPTION OF THE PREFERRED EMBODIMENTS

Figure 1:
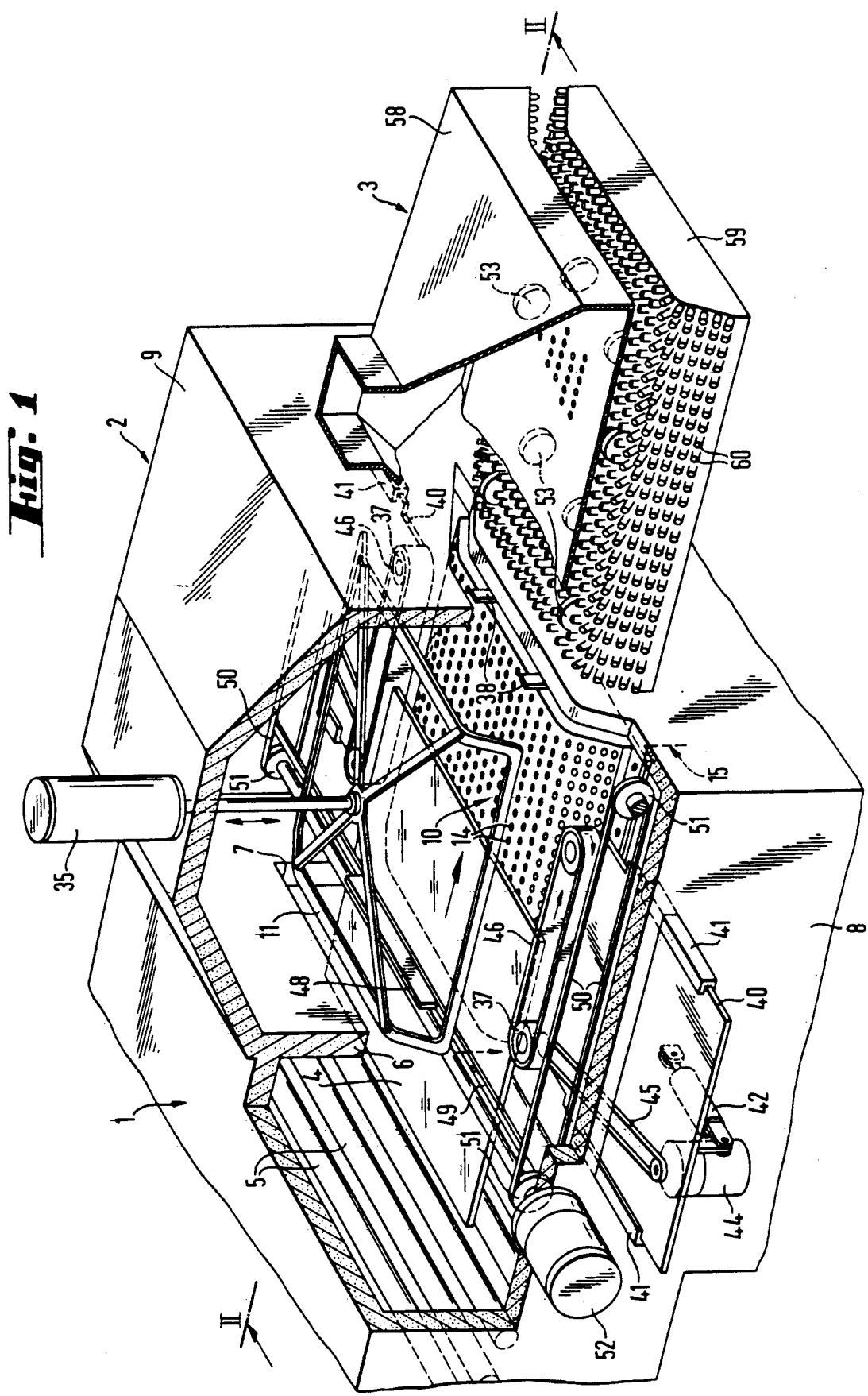
FIG. 1 is a perspective view, partly in section, of a first embodiment of the invention.

As can be seen from FIG. 1, the apparatus fundamentally comprises a horizontal roller oven 1, a bending station 2 and a cooling station 3, which in the illustrated case is constructed as a tempering station.

The roller oven 1 is a horizontal continuous oven of known construction used for heating the glass plates 4 to the necessary bending temperature. The conveying rollers 5 on which the glass plates 4 are conveyed through the oven are driven in known manner. The end of the roller oven 1 is terminated by an end wall 6. The end wall 6 contains a slot-like opening 7, through which the heated glass plate passes out of the oven and into the bending station 2.

Bending station 2 directly follows oven 1. The actual bending tools are arranged within a closed casing comprising a lower casing part 8 and an upper casing part 9. Within the lower casing part 8 is positioned the male mold-like bending mold 10 and within the upper casing part 9 the female mold-like bending mold as a frame bending mold 11.

The male mold-like bending mold 10 is constructed as a full surface bending mold and constitutes in part the surface of a cylinder. The directrix of this cylinder surface corresponds to the desired cross-sectional shape of the glass plates to be produced. The generatrixes of the cylinder surface extend in the direction of the longitudinal axis of the plant, i.e., in the glass plate conveying direction. The central field of the bending surface is planar and the bending mold 10 is arranged at such a height that the generatrixes of said central field of the bending mold 10 are level with the conveying plane predetermined by the conveying rollers 5.

Figure 2:
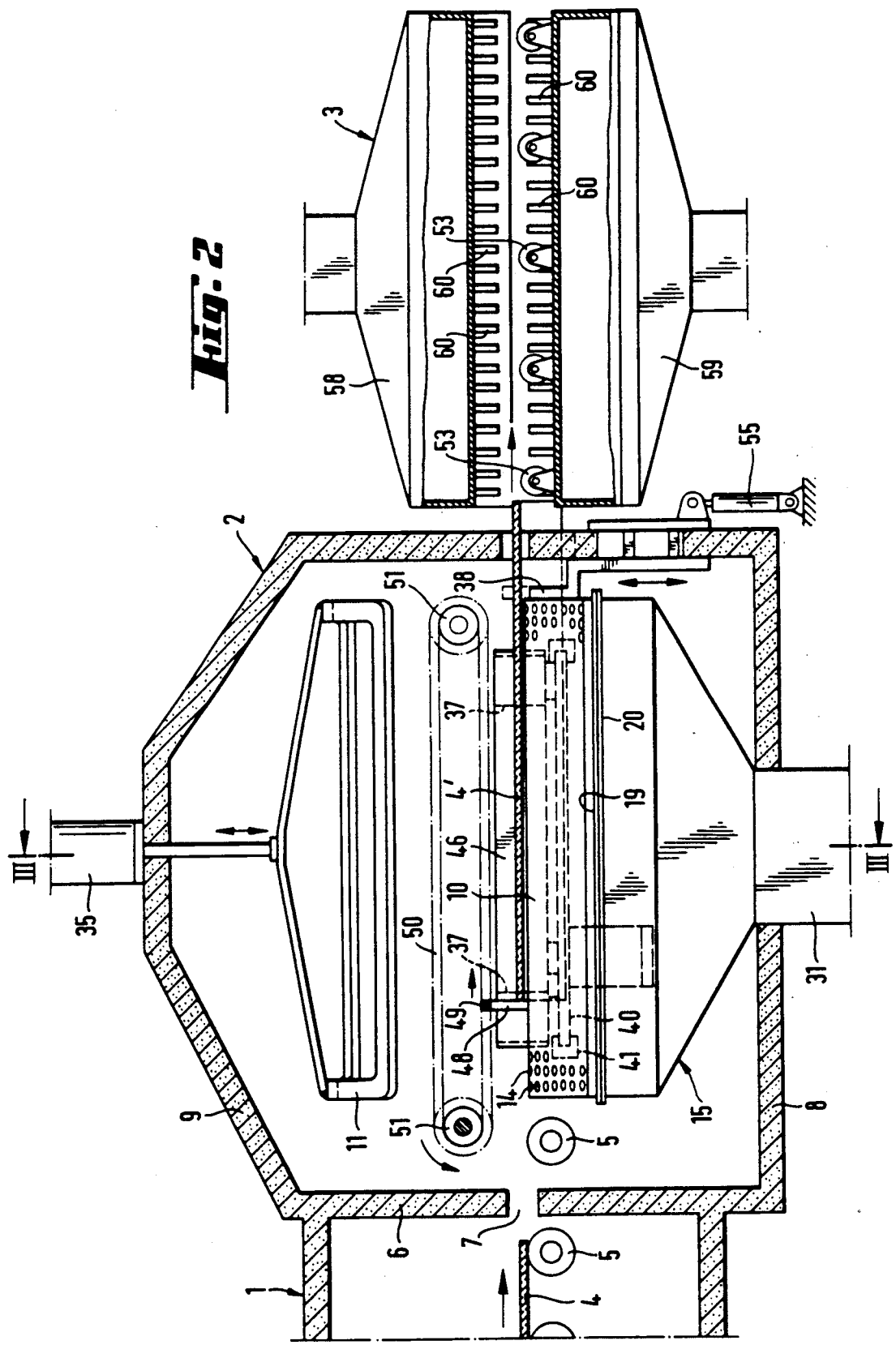
FIG. 2 is a vertical longitudinal section along line II—II in FIG. 1.
Figure 3:
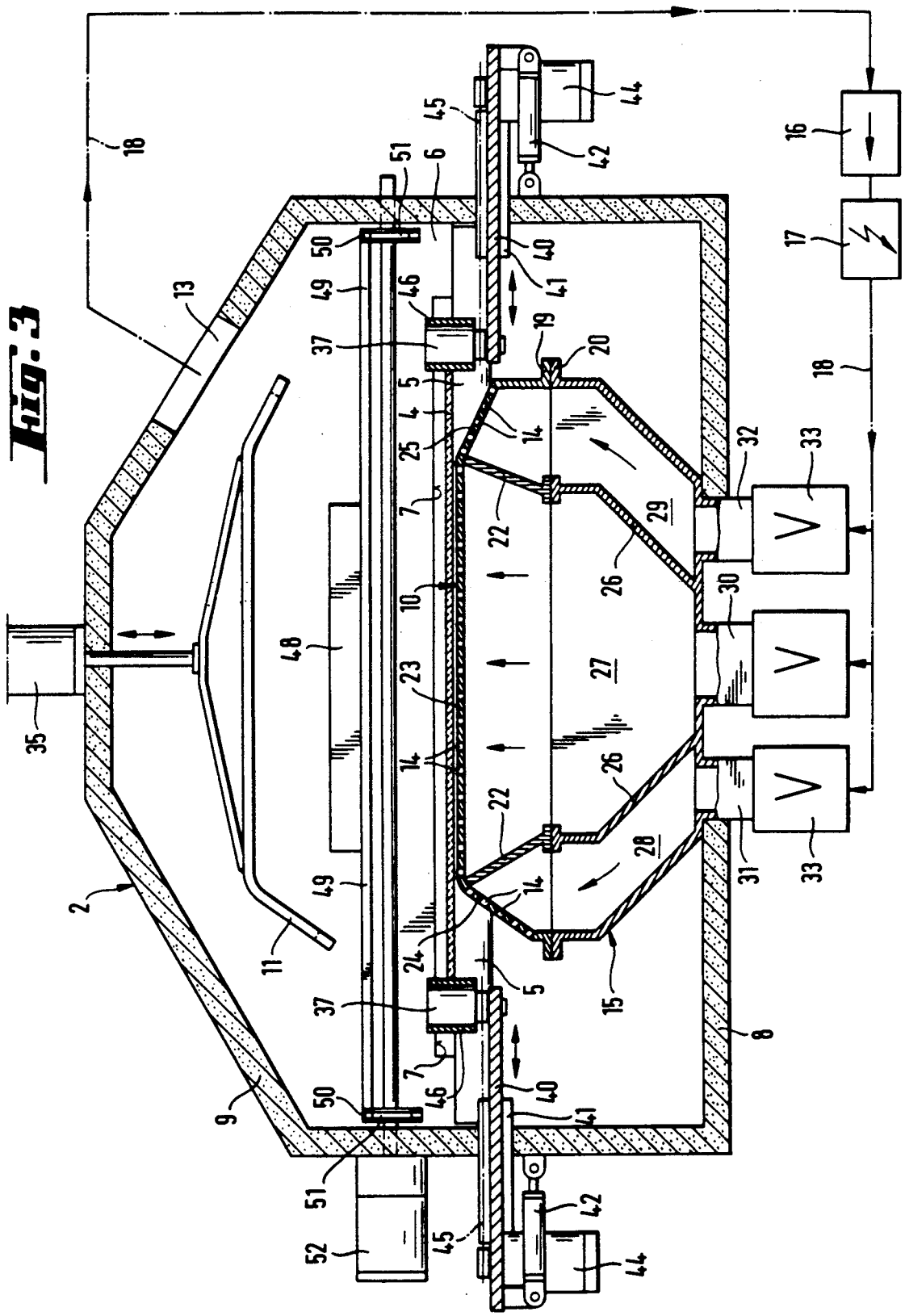
FIG. 3 is vertical cross-section along like III—III in FIG. 2.

As can be seen in FIGS. 2 and 3, the full surface bending mold 10 comprises a metal plate and is provided with a plurality of bores 14. The bending mold 10 forms the upper terminating plate of a closed chamber 15, into which hot gas under overpressure is passed. The hot gas, which has a temperature roughly corresponding to that of the glass plate 4, flows out of the bores 14 and forms a hot gas cushion on which the glass plate 4 floats, without it coming into contact with the surface of the bending mold 10 during the sliding movement. The necessary volume flow of the hot gas is produced by a fan 16. A heating unit 17 heats the gas flow to the necessary temperature. The hot gas can be drawn out of the opening 13 in the upper casing part 9 and returned in a circuit through line 18 to the pressure chamber 15.

At its lower end, bending mold 10 has a flange 19, with the aid of which it is fixed to a corresponding flange 20 on the pressure chamber casing 15. If necessary, this makes it possible to replace the full surface bending mold 10 by another such mold.

As can be gathered from FIG. 3, it can be appropriate to provide the lower side of the full surface bending mold 10 with partitions 22 and to supply the bending surface fields separated by these, namely the central field 22 and the two bent, lateral fields 24 and 25, separately with pressurized gas, whose volume flow and pressure can in each case be separately regulated. For this purpose, the partitions 22 in bending mold 10 are connected to corresponding partitions 26 within casing 15. The partial cavities 27, 28, 29 formed in this way are supplied with hot pressurized gas via separate connecting lines 30, 31 and 32 and via separate control valves 33.

The frame bending mold 11 located within the upper casing part 9 can be raised and lowered with the aid of the pneumatic or hydraulic cylinder 35, or with the aid of a corresponding mechanical lifting means.

Laterally of the lower bending mold 10 are provided lateral guide rollers 37 for the glass plate 4. The guide rollers 37 are used for keeping the glass plate 4 in the necessary position on its path from the roller oven 1 into the bending station 2 and within the latter. Stops 38, which can be lowered below the conveying plane, are used for positioning the glass plate 4 in the conveying direction.

The lateral guide rollers 37 are mounted on a carriage 40, which is displaceable in rails 41 at right angles to the conveying direction of the glass plates 4. The carriage 40 can be moved into the desired position by a hydraulic cylinder 42 or by a corresponding mechanical drive.

On the part of the carriage 40 projecting out of the lower casing part 8 is arranged an electric motor 44 which, by means of a driving belt or chain 45 drives one of the rollers 37. A heat-resistant material band 46 passes over the two rollers 37 and in this way is driven with a regulatable speed via driving belt 45. The thus driven band 46 serves to laterally guide the glass plate 4 on its way from the oven 1 into the bending station 2 and simultaneously, via the contact with the lateral edge of the glass plate 4, ensures the further conveying of the latter into the end position. The same arrangement of guide rollers 37 and a driven band 46 is provided on the facing longitudinal side of the bending station.

Within the bending station 2 is also provided a conveying means, with the aid of which after carrying out the bending process, the glass plate 4 is moved from the bending station 2 into the following cooling station 3. In the illustrated case this conveying means comprises a slide 48, which is fixed to a rod 49, which is in turn respectively fixed on either side to endless chains 50. Each of the chains 50 is mounted in a laterally spaced manner from the bending mold on chain wheels or sprockets 51 above the conveying plane of the glass plates and at such a height that the slider 48 grips the rear edge of the glass plate 4 when the strip 49 with the slider 48 is located on the lower run of the chains 50. The chains 50 with the slider 48 are rotated by the controlled motor 52, the slider 48 moving the bent glass plate 4' out of the bending station and into the cooling station 3. The further conveying of the glass plates is taken over by driven conveying rollers 53 in cooling station 3. At the end of the sliding process, the slider 48 is detached from the glass plate 4' and returns to its starting position at the upper run of the chains 50, said starting position being located outside the area of the frame bending mold 11 during the pressing process.

The following process sequence occurs when carrying out a bending cycle. As soon as the leading edge of a glass plate 4, which has been heated to the bending temperature in the oven 1, passes into the bending station and approaches the lower bending mold 10, with the aid of a (not shown) control circuit, fan 16 is switched on and consequently hot air acts from below on the perforated bending mold 10. The hot gas passing out of the bores 14 forms a hot gas cushion between the surface of the bending mold 10 and the glass plate 4. The glass plate 4, as a result of its kinetic energy or, if necessary, due to the frictional force transferred by the driven band 46, passes on the hot gas cushion to its end position, which is defined in the movement direction by stop 38 and is defined laterally by the rollers 37 and the band 46. As soon as the glass plate has reached its end position, the hot gas flow to the lower bending mold is interrupted, so that the glass plate 4 is applied to the bending mold 10. With the aid of the pressure cylinder 35, the frame bending mold 11 is now lowered and presses the glass plate 4 against the full surface bending mold 10. Stop 38 is then lowered by the pneumatic cylinder 55 and frees the path for the bent glass plate 4' into the cooling station. The pressure cylinder 35 then raises the frame bending mold 11 back into its upper end position. As soon as the path for the slider 48 is freed by the frame bending mold 11, motor 52 is switched on, so that the slider 48 is brought into its lower working position. Simultaneously the fan 16 is switched on again, so that once again a hot gas cushion is formed between the full surface bending mold 10 and the bent glass plate 4'. Floating on said hot gas cushion, the glass plate is moved with the aid of slider 48 onto the cooling station 3, where it undergoes accelerated cooling with cold air in a per se known manner with the aid of two blowing boxes 58, 59, which are in each case equipped with blowing nozzles 60, and is consequently tempered.

Figure 4:
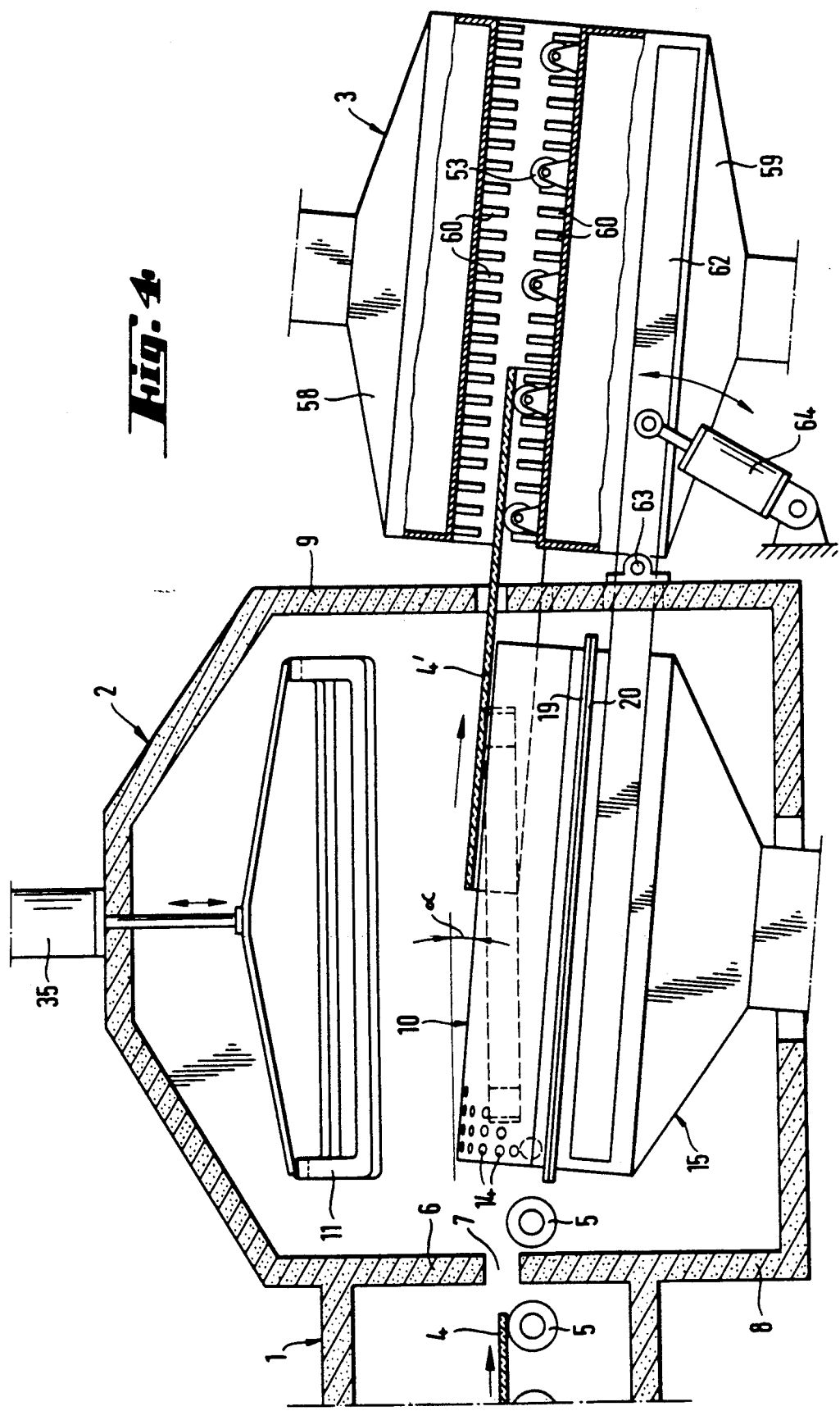
FIG. 4 is a vertical longitudinal view of another embodiment of the invention.
Figure 5:
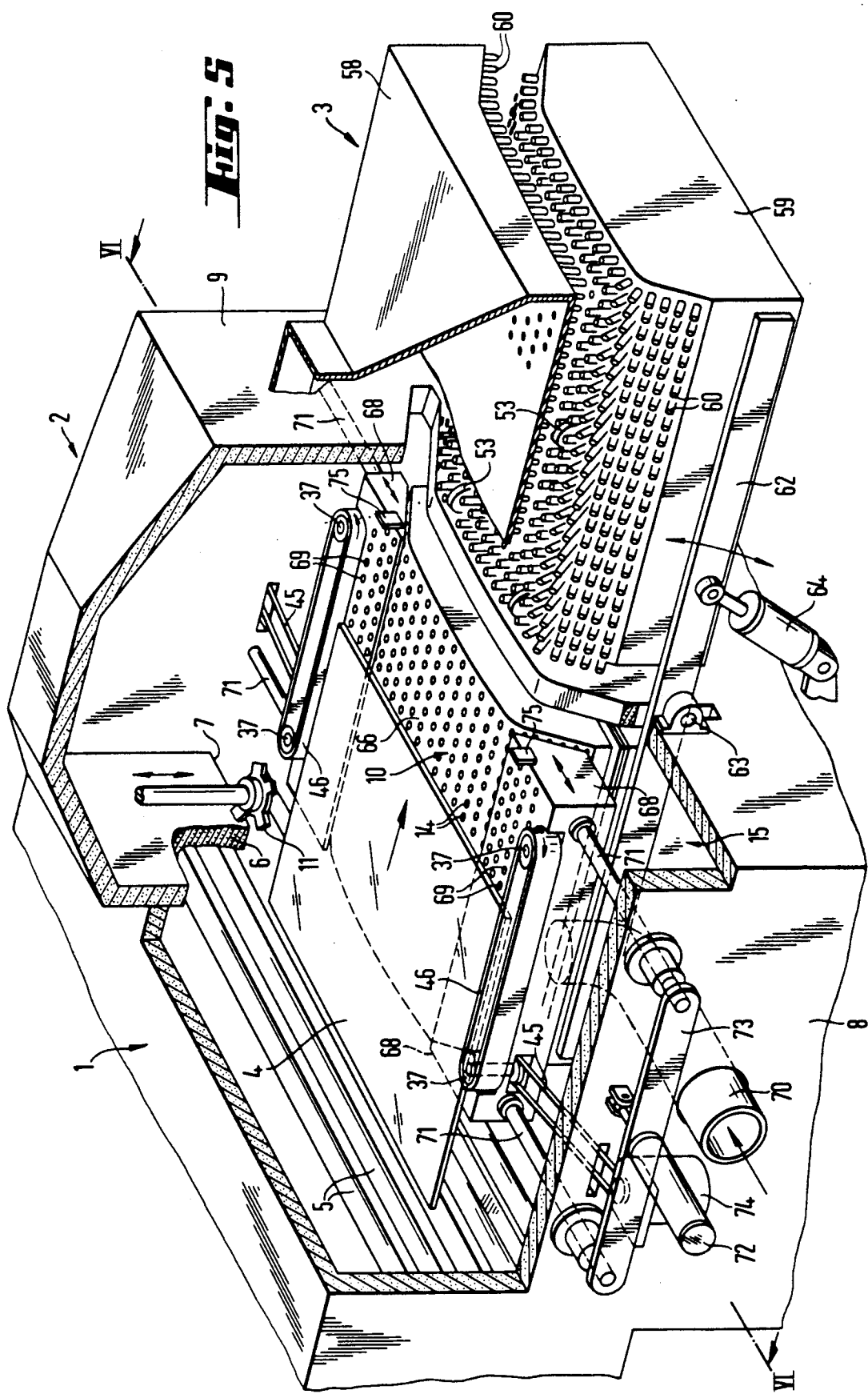
FIG. 5 is a perspective view, partly in section, of another embodiment of the invention.

Another possibility for conveying the bent glass plate 4' into cooling station 3 from bending station 2 at the end of the bending process is shown in FIGS. 4 and 5. In this case, the lower bending mold 10, including the pressure chamber 15 on the one hand and the blowing apparatus comprising the two blowing boxes 58, 59 on the other, are fixed to a common support frame 62, which is pivotably mounted about a horizontal spindle 63. With the aid of the hydraulic or pneumatic cylinder 64, the support frame 62 can be pivoted by an angle α. When the glass plate 4 passes from the oven 1 into the bending station 2, the support frame 62 is in its horizontal position. As soon as the glass plate 4 has reached its end position on the bending mold 10, it is tilted in the described manner with the aid of the frame bending mold 11. As soon as the bending process is ended and the frame bending mold 11 has again assumed its upper end position, hot compressed air is supplied to the pressure chamber 15. As a result the bent glass plate 4' is lifted from the mold surface as a hot gas cushion forms and the glass plate 4' floats on it. The pressure cylinder 64 is then operated and the support frame 62 is pivoted by an angle α. Due to its own weight, the glass plate 4' now slides into the cooling station, where it is taken over by the rollers 53 and passes into a (not shown) removal station.

Also in the case of the apparatus shown in FIGS. 5 and 6, the lower bending mold 10, the pressure chamber 15 and the two blowing boxes 58, 59 are arranged on the common support frame 62, which is pivotable about pivot pin 63 with the aid of the pressure cylinder 64, so that following the bending process the glass plate 4' can be conveyed from the bending station into the cooling station 3. In this embodiment the central field 66 of the bending mold 10 is not planar and is instead slightly cylindrically bent. Thus, on entering the bending station, the glass plate 4 is supported by laterally arranged, additional gas cushion support means 68. The latter comprise pressure chambers adapted to the geometry of the bending mold 10, whose upper surface is planar and has bores 69, through which the hot gas flows out for forming the hot gas cushion. The support means 68 are supplied with hot pressurized gas via pressure lines 70. They are fixed to displaceably mounted rods 71 and are operated by pressure cylinder 72, which act on the two rods 71 by means of the connecting links 73. With the aid of one of the pressure cylinders 72, each support means 68 is brought into the working position shown in the drawings when the glass plate 4 leaves the oven 1 and passes into the bending station. As soon as the glass plate 4 has reached its end position in the bending station, the two support means 68 are retracted with the aid of the pressure cylinders 72, whereupon the glass plate engages on the lower bending mold 10 initially under its own weight and then under the action of the frame bending mold 11.

On the support means 68 are in each case mounted two guide rollers 37 over which passes the flexible band 46. One of the rollers 37 is driven by motor 74 via driving chain 45. The motor 74 is in turn arranged on the connecting link 73. In this way, the lateral regions of the glass plates are supported from below with the aid of the described support means and are simultaneously guided on their lateral edges. They are optionally conveyed by friction grip and are thus brought into their end position, as defined by stops 75.

If the lateral end regions of the glass plate 4 are to be strongly bent, it is advantageous to use as the upper frame bending mold a multipart bending mold, as shown in FIG. 6. The frame bending mold 77 is constructed in multipart form in per se known manner and it comprises a central part 78 and two lateral parts 78, 79 pivotably arranged on the central part 78. Side parts 79, 80 are in each case provided with a lever arm 81, to which is in each case articulated a lever 82. Levers 82 are in turn articulated to a crank mechanism 83, which is operated by a rod 84. The two side parts 79, 80 of frame bending mold 77 are flapped downwards with the aid of rod 84, as soon as the bending mold 77 has been lowered onto the glass plate resting on the lower mold 10 with the aid of the piston rod 85 operated by a pressure cylinder.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for producing two-dimensionally bent glass plates, comprising:
    a roller oven having horizontally extending conveying rollers, for heating a horizontally positioned glass sheet to a bending temperature;
    a pressing and bending unit positioned downstream of said roller oven in a glass sheet conveying direction, comprising:
    (a) a lower full surface male bending mold having a perforate top surface lying in a plane defined by said conveying rollers,
    (b) means for supplying pressurized hot gasses to the perforations of said lower bending mold, whereby a hot gas cushion may be formed between said lower bending mold and a glass sheet in said pressing and bending unit,
    (c) a female mold positioned over said lower bending mold, and
    (d) means for vertically moving said female mold towards said lower bending mold for pressing and bending a glass sheet resting thereon; a cooling device positioned downstream from said pressing and bending unit for cooling a bent glass sheet; and
    means for conveying a glass sheet from said roller oven to said pressing and bending unit and means for transferring a bent glass sheet from said pressing and bending unit to said cooling device.

2. The apparatus of claim 1 including means for selectively controlling the supply of hot gases in said hot gasses supplying means.

3. The apparatus of claim 1 wherein said means for transferring a bent glass plate from said pressing and bending unit to said cooling device, comprises a slider movable to a position for contacting and pushing on a downstream edge of a glass sheet in said pressing and bending unit.

4. The apparatus of claim 1 wherein said means for transferring a bent glass plate from said pressing and bending unit to said cooling device comprises means for tilting said lower bending mold.

5. The apparatus of claim 1 including means for positioning a glass sheet on said lower bending mold in a direction lateral to said conveying direction.

6. The apparatus of claim 5 wherein said positioning means are adjustable in the direction lateral to said conveying direction.

7. The apparatus of claim 5 wherein said positioning means are positioned on two lateral sides of said lower bending mold, the positioning means on each lateral side of said lower bending mold comprising:
    two rollers rotatable about vertical axes and spaced in the conveying direction; and
    an endless, flexible, heat resistant band running around said two rollers.

8. The apparatus of claim 7 including means for driving at least one of said two rollers.

9. The apparatus of claim 1 wherein said means for supplying hot gasses comprises means for forming a pressure chamber for which said lower bending mold is a top surface, wherein said means for forming a pressure chamber including a casing detachable from said lower bending mold.

10. The apparatus of claim 9 including means for dividing said pressure chamber into plural cavities, wherein said lower bending mold is divided into plural fields respectively fluidically communicating with said plural cavities.

11. The apparatus of claim 1 including laterally movable gas cushion support means positioned at lateral sides of said lower bending mold and having upper surfaces coplanar with said conveying rollers.

12. The apparatus of claim 1 wherein said female bending mold is a multi-part bending mold having a central part and side parts pivotally connected thereto.

13. The apparatus of claim 1 including a casing enclosing said pressing and bending unit.

14. The apparatus of claim 13 including means for recirculating hot gasses from said casing to said hot gasses supplying means.

* * * * *